United States Patent [19]
Daly et al.

[11] Patent Number: 6,013,738
[45] Date of Patent: Jan. 11, 2000

[54] COMPOSITION AND METHOD FOR CHIRAL SEPARATIONS

[75] Inventors: William H. Daly; Drew S. Poché; Stefan J. Thibodeaux; Isiah M. Warner, all of Baton Rouge, La.

[73] Assignee: Board of Supervisors of Louisiana State University and Agricultural and Mechanical College, Baton Rouge, La.

[21] Appl. No.: 09/154,377

[22] Filed: Sep. 16, 1998

Related U.S. Application Data

[60] Provisional application No. 60/113,670, Sep. 23, 1997.

[51] Int. Cl.[7] .................................................. C08F 283/04
[52] U.S. Cl. ......................... 525/426; 528/328; 210/635; 210/656; 210/198.2; 210/502.1
[58] Field of Search ..................... 525/426, 432, 525/420; 528/328; 210/635, 656, 198.2, 502.1

[56] References Cited

U.S. PATENT DOCUMENTS

| | | | |
|---|---|---|---|
| 3,948,863 | 4/1976 | Akamatsu | 525/420 |
| 4,385,169 | 5/1983 | Kato | 528/328 |
| 4,694,044 | 9/1987 | Kiniwa | 210/635 |
| 4,743,675 | 5/1988 | Watanabe | 528/328 |
| 4,747,956 | 5/1988 | Kiniwa | 210/679 |
| 4,840,975 | 6/1989 | Hirayama | 528/328 |
| 4,948,816 | 8/1990 | Hirayama | 528/328 |

OTHER PUBLICATIONS

Canet, I. et al., "Enantiomeric Excess Analysis of (2R, 3S)–3–Deuterio–2–methylcyclohexanone and (1S,2R, 3S)–3–Deuterio–2–methylcyclohexanol through Deuterium NMR in a Polypeptide Lyotropic Liquid Crystal," *Tetrahedron: Asymmetry*, vol. 6, pp. 333–336 (1995).

Lesot, P. et al., *J. Chem. Soc. Faraday Trans.*, vol. 91, pp. 1371–1375, (1995).

Maruyama, A. et al., "Enantioselective Permeation of α–Amino Acid Isomers through Poly(amino acid)–Derived Membranes," *Macromolecules*, vol. 23, pp. 2748–2752 (1990).

Ogata, N., "Supramolecular Polymers having Chiral Interactions," p. 390, 35th International Symposium on Macromolecules (Akron, Ohio 1994).

Ogata, N., *Chem. Abstr.* 111:155255w (1989).
Ogata, N., *Chem. Abstr.* 118:100517x (1993).
Ogate, N., *Chem. Abstr.* 119:9159s (1993).
Ogata, N., *Chem. Abstr.* 120:299298w (1994).
Ogata, N., *Chem, Abstr.* 124:30327h (1996).
Ogata, N., *Chem. Abstr.* 125:87148a (1996).
Ogata, N., *Chem. Abstr.* 126:186540z (1997).
Ogata, N., *Chem. Abstr.* 126:145850g (1997).

Otsuka, K. et al., "Optical Resolution by High–Performance Capillary Electrophoresis: Micellar Electrokinetic Chromatography with Sodium N–Dodecanoyl–L–Glutamate and Digitonin," *J. Chromatog. A.*, vol. 652, pp. 253–257 (1993).

Pocé, D., "Novel Rod–like Polymers for Application in Chiral Recognition," *The Spectrum*, vol. 15, No. 1, p. 10 (1996) pp. 1 & 10.

Primary Examiner—Ernest G. Therkorn
Attorney, Agent, or Firm—John H. Runnels

[57] ABSTRACT

Polymers are disclosed that are useful in performing chiral separations. A synthetic scheme for producing the novel polymers is also disclosed. The alkyl side chains of poly(γ-alkyl-α,L-glutamates) have been altered, allowing the facile substitution of the side chains with pendent functional groups. The compounds may be used as a stationary-phase or pseudo-stationary phase in separation techniques such as high performance liquid chromatography, or electrokinetic capillary chromatography. The novel compounds are water-soluble or water-swellable, and are particularly useful in separations of stereoisomers.

8 Claims, 2 Drawing Sheets

COMPOSITION AND METHOD FOR CHIRAL SEPARATIONS

The benefit of the Sep. 23, 1997 filing date of provisional application 60/113,670 is claimed under 35 U.S.C. §119 (e).

The development of this invention was partially supported by the Government under grant NIH 5-R01-GM39844 from the National Institutes of Health. The Government has certain rights in this invention.

This invention pertains to methods and compositions useful in separations of stereoisomers.

The separation of mixtures of stereoisomers (enantiomers or diastereomers) into individual optical isomers is one of the most challenging problems in analytical chemistry, reflecting practical considerations important in many areas of science, particularly the pharmaceutical and agricultural industries.

For example, the pharmaceutically active site of many drugs is "chiral," meaning that the active site is not identical to a mirror image of the site. However, many pharmaceutical formulations marketed today are racemic mixtures of the desired compound and its "mirror image." One optical form (or enantiomer) of a racemic mixture may be medicinally useful, while the other optical form may be inert or even harmful, as has been reported to be the case for thalidomide. Chiral drugs are now extensively evaluated prior to large scale manufacturing, both to examine their efficacy, and to minimize undesirable effects attributable to one enantiomer or to the interaction of enantiomers in a racemic mixture. The United States Food and Drug Administration has recently issued new regulations governing the marketing of chiral drugs.

Separating optical isomers often requires considerable time, effort, and expense, even when state-of-the-art chiral separation techniques are used. There is a continuing and growing need for improved chiral separation techniques.

Early chiral separation methods used naturally occurring chiral species in otherwise standard separation protocols. For example, natural chiral polymeric adsorbents such as cellulose, other polysaccharides, and wool were used as early as the 1920's. Later strategies used other proteins and naturally occurring chiral materials. These early strategies gave some degree of success. However, the poor mechanical and chromatographic properties of naturally occurring materials often complicated the separations. Although naturally occurring chiral materials continue to be used for chiral separations, efforts have increasingly turned to synthesizing chiral materials having better mechanical and chromatographic properties.

In recent years, the two separation methods most often employed for chiral separations have been high performance liquid chromatography and capillary electrophoresis, both of which have high efficiencies. High separation efficiencies are required for chiral separations because the difference in molar free energies of the interactions that discriminate between individual enantiomers is small, typically on the order of 100 calories per mole. The sum of the weighted time averages of these small interactions determines the overall enantioselectivity of a separation technique. High efficiencies are therefore important to improved chromatographic chiral separations. Achiral separations on the order of 100,000 theoretical plates are readily achievable with capillary electrophoresis. Thus, small chiral selectivities can be magnified using capillary electrophoresis.

The so-called "three point rule" is a commonly used rule-of-thumb in many chiral recognition strategies. The "three point rule" recommends that there be a minimum of three simultaneous interactions between the chiral recognition medium and at least one of the enantiomers to be separated. In addition, at least one of the three interactions must be stereochemically dependent. The three interactions need not be attractive interactions, and may for example employ repulsion due to steric effects.

A. Maruyama et al., "Enantioselective Permeation of α-Amino Acid Isomers through Poly(amino acid)-Derived Membranes," *Macromolecules*, vol. 23, pp. 2748–2752 (1990) discloses poly (L-glutamates) having amphiphilic side chains of (n-nonylphenoxy)oligo(oxyethylene), and states that these polymers could be used in membranes for resolving optical isomers of α-amino acids.

K. Otsuka et al., "Optical Resolution by High-Performance Capillary Electrophoresis: Micellar Electrokinetic Chromatography with Sodium N-Dodecanoyl-L-Glutamate and Digitonin," *J. Chromatog. A*., vol. 652, pp. 253–257 (1993) discloses that certain enantiomers could be resolved by micellar electrokinetic chromatography with sodium N-dodecanoyl-L-glutamate micelles.

N. Ogata, "Supramolecular Polymers having Chiral Interactions," p. 390, 35th International Symposium on Macromolecules (Akron, Ohio 1994) discloses the resolution of racemic mixtures including racemic tryptophan by selective permeation through a membrane prepared by a graft polymerization of L-glutamate NCA onto poly (allylamine).

I. Canet et al., "Enantiomeric Excess Analysis of (2,R,3S)-3-Deuterio-2-methylcyclohexanone and (1S,2R,3S)-3-Deuterio-2-methylcyclohexanol through Deuterium NMR in a Polypeptide Lyotropic Liquid Crystal," *Tetrahedron: Asymmetry*, vol. 6, pp. 333–336 (1995) discloses that dichloromethane solutions of poly-γ-benzyl-L-glutamate can be used as a chiral deuterium NMR solvent to distinguish between enantiomers, and that it can be used as a solvent for enantiomeric excess analysis of molecules containing several chiral centers.

P. Lesot et al., "Visualization of Enantiomers in a Polypeptide Liquid-crystal Solvent through Carbon-13 NMR Spectroscopy," *J. Chem. Soc. Faraday Trans*., vol. 91, pp. 1371–1375 (1995) discloses the use of poly(γ-benzyl-L-glutamate), which is water-insoluble, to make spectral measurements of certain enantiomers.

Separations of certain optical isomers using poly(L-glutamate), poly(γ-benzyl glutamate), poly(γ-methyl-L glutamate), the reaction product of poly(γ-methyl-L glutamate) with poly(oxyethylene) nonylphenyl ether, and a poly(L-glutamic acid/polypyrrole composite are disclosed in N. Ogata, *Chem. Abstr.* 111:155255w (1989); N. Ogata, *Chem. Abstr.* 118:100517x (1993); N. Ogata, *Chem. Abstr.* 119:9159s (1993); N. Ogata, *Chem. Abstr.* 120:299298w (1994); N. Ogata, *Chem. Abstr.* 124:30327h (1996); and N. Ogata, *Chem. Abstr.* 126:145850g (1997). See also N. Ogata, *Chem. Abstr.* 125:87148a (1996); and N. Ogata, *Chem. Abstr.* 126:186540z (1997).

There is a continuing need for new compositions and methods useful in chiral separations of enantiomeric mixtures.

We have discovered a novel class of polymers useful in performing chiral separations, and have discovered a synthetic scheme for producing the novel polymers using novel intermediates.

The novel compounds may be described generically as a polymer, or a salt of a polymer, having the formula

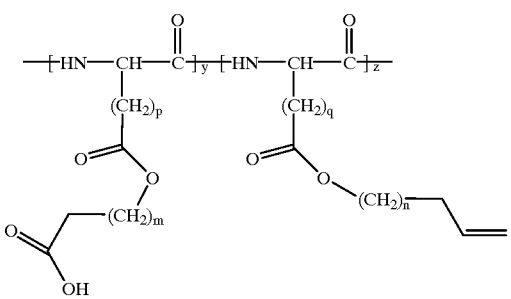

wherein y is between 0.3 and 1.0; wherein z is between 0.0 and 0.7; wherein the sum of y and z is 1.0; wherein the monomer subunits designated with the subscripts y and z in the formula above may be randomly or regularly distributed with respect to one another, or may be distributed to form a block copolymer; wherein m is an integer between 0 and 19; wherein m may be the same in all cases, or m may differ between different monomer subunits of said polymer; wherein n is an integer between 0 and 19; wherein n may be the same in all cases, or n may differ between different monomer subunits of said polymer; wherein p is 1 or 2; wherein p may be the same in all cases, or p may differ between different monomer subunits of said polymer; wherein q is 1 or 2; and wherein q may be the same in all cases, or q may differ between different monomer subunits of said polymer. Preferably, y is between 0.5 and 0.7; z is between 0.3 and 0.5; m is an integer between 2 and 7; n is an integer between 2 and 7; and the monomer subunits designated with the subscripts y and z in the formula are randomly or regularly distributed with respect to one another, but do not form a block copolymer. In another preferred embodiment, m=0, n=0, y is between 0.9 and 1.0, and z is between 0.0 and 0.1. Optionally, some or all of the carboxylic acid groups in the monomer subunits designated with the subscript y may be condensed with one or more of the 20 naturally occurring amino acids (or their enantiomers) to form additional chiral centers.

We have developed syntheses for substituting the alkyl side chains of poly(γ-alkyl-α,L-glutamates), compound 1a, with pendent functional groups. (See FIG. 1.) Poly-asparates may be used as well as poly-glutamates. If desired, the novel polymers may be readily crosslinked through C=C double bonds in the pendent side chains, without disrupting the polymer backbone peptide links, generating stable, solvent-swollen, gels. The novel polymers may be used as a stationary-phase or pseudo-stationary phase in separation techniques such as high performance liquid chromatography or electrokinetic capillary chromatography. The polymers are either water-soluble or they swell in aqueous media, and are particularly useful in separations of stereoisomers (enantiomers or diastereomers).

The three-point rule is satisfied by the novel chiral polymers, which have at least three functional groups that can yield different chiral environments: (1) the chiral center in the polypeptide backbone; (2) the secondary conformation of that backbone; and (3) the pendent functional groups such as carbonyl, carboxyl, or vinyl, including hydrophobic interactions with side chains.

DESCRIPTION OF THE PREFERRED EMBODIMENTS

Figure 1:
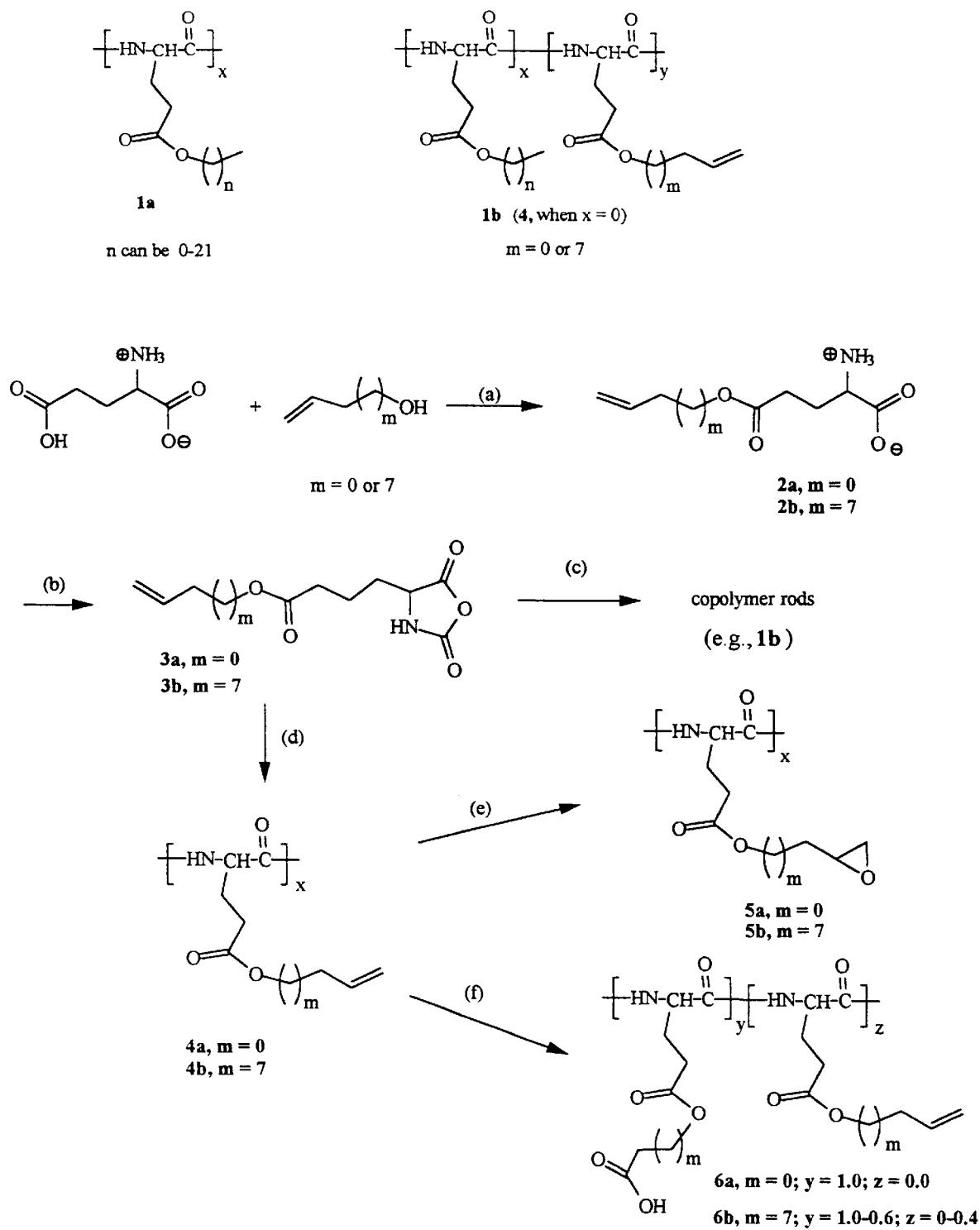
FIG. 1 illustrates several compounds discussed in the specification, and depicts preferred synthetic routes to several embodiments of the novel polymers, starting with L-glutamic acid.

In the specific embodiments synthesized to date, m=0 or 7, and n=0 or 7, as shown in FIG. 1. However, m and n are not limited to these values, and may each have any desired value between 0 and about 19.

All structures shown in FIG. 1 were verified by Fourier transform infrared spectrometry, and 200 or 250 MHz $^1$H nuclear magnetic resonance. The γ-esters 2a and 2b were prepared by reacting allyl alcohol or 9-decen-1-ol with L-glutamic acid, in t-butanol solvent. In both cases, a 6- to 8-fold molar excess of the alcohol was used with a molar equivalent of sulfuric acid, both with respect to the L-glutamic acid. After 1–1.5 hours at 60° C., the reaction was stopped by neutralization with triethylamine. The γ-(9-decenyl)-L-glutamate 2b precipitated from solution upon cooling to room temperature. The γ-allyl-L-glutamate 2a crystallized from the reaction mixture after cooling at 10° C. overnight. Table 1 gives a brief summary of some of the properties of compounds 2a and 2b. Both 2a and 2b displayed IR bands at 1640 cm$^{-1}$ (C=C); 1739 cm$^{-1}$ (ester). N-carboxyanhydride (NCA) derivatives of 2a and 2b (discussed further below) showed characteristic bands at 1790 cm$^{-1}$ and 1861 cm$^{-1}$. In addition to the spectroscopic evidence for the intact C=C group in Table 1, we also observed that a drop of bromine in carbon tetrachloride applied to solid 2b was rapidly decolorized. The yields for both 2a and 2b after recrystallization were ~25–30%. It may be possible to improve these yields by optimizing reaction conditions further.

TABLE 1

Properties of γ-alkenyl-L-glutamates 2a and 2b.

| Compound | Recrystallization Solvent | Melting Point, °C. | $^1$H NMR, ppm; CDCl$_3$/TFA | NCA Derivative (3a or 3b), $^1$H NMR, ppm; CDCl$_3$ |
| --- | --- | --- | --- | --- |
| 2a | 9:1 methanol:water | 193–194 | α-CH, 4.3 (t); β-CH$_2$, 2.3 (m); γ-CH$_2$, 2.8 (t); —CH=CH$_2$, 5.3 (m); —CH=CH$_2$, 5.9 (m); O—CH$_2$, | oil: α-CH, 4.4 (5); β-CH$_2$, 2.2 (m); γ-CH$_2$, 2.6 (t); —CH=CH$_2$, 5.3 (m); —CH=CH$_2$, |

TABLE 1-continued

Properties of γ-alkenyl-L-glutamates 2a and 2b.

| Compound | Recrystallization Solvent | Melting Point, °C. | $^1$H NMR, ppm; CDCl$_3$/TFA | NCA Derivative (3a or 3b), $^1$H NMR, ppm; CDCl$_3$ |
|---|---|---|---|---|
| 2b | 1:1 isopropanol: water | 188–190 | 4.6 (d); —NH$_3^+$, 7.8 (s, b) α-CH, 4.2 (t); β-CH$_2$, 2.3 (m); γ-CH$_2$, 2.7 (t); —CH=CH$_2$, 4.9 (m); —CH$_2$CH=CH$_2$, 2.0 (m); —CH=CH$_2$, 5.9 (m); —(CH$_2$)$_6$—, 1.3 (s, b); O—CH$_2$, 4.1 (t); —NH$_3^+$, 7.8 (s, b) | 5.9 (m); O—CH$_2$, 4.6 (d); —NH (ring), 6.6 (s) oil: α-CH, 4.4 (t); β-CH$_2$, 2.2 (m); γ-CH$_2$, 2.5 (t); —CH=CH$_2$, 4.9 (m); —CH$_2$CH=CH$_2$, 2.1 (m); —CH=CH$_2$, 5.8 (m); —(CH$_2$)$_6$—, 1.3 (s, b); O—CH$_2$, 4.1 (t); —NH (ring), 6.8 (s) |

The reaction of 2a or 2b with triphosgene gave the N-carboxyanhydride (NCA) monomer 3, without loss of the C=C double bond. NCA monomers 3a and 3b were isolated as oils. Monomers 3a and 3b may be polymerized with a strong base or nucleophile; triethylamine or a primary amine are preferred bases for this polymerization reaction. The molecular weight was controlled by the initiator chosen. For example, lower molecular weight materials were produced using n-butylamine as initiator, with monomer:initiator molar ratios less than ~50. Matrix-assisted laser desorption ionization (MALDI) data indicated polymer molecular weights of about 5,000–6,000 (corresponding to a degree of polymerization, d.p., of about 20). A random copolymer was produced by dissolving the monomers in the polymerization solvent prior to adding the initiator. For example, polymer 1b with y≈0.1 and x≈0.9 was synthesized by adding initiator to a tetrahydrofuran (THF) solution containing a 10:1 weight ratio of γ-decyl-L-glutamate NCA to γ-(9-decenyl)-L-glutamate NCA (3b). The incorporation of monomers into the polymer in this ratio was verified by $^1$H NMR. Polymer 4b was readily soluble in THF, chloroform, or dichloromethane. Polymer 4a was poorly soluble, even "gelling" during its synthesis in THF or chloroform. Gelling could be avoided by carrying out the polymerization in chlorobenzene.

Polymer 4a or 4b was then reacted with m-chloroperoxybenzoic acid (MCPBA) to produce polymer 5a or 5b, polymers with pendent epoxy groups. The epoxidation reaction was a quantitative conversion (as determined by 250 MHz $^1$H NMR), when refluxed 2–3 hours in chloroform. Polymer 5a or 5b can be isolated by evaporating the reaction to near dryness, dissolving the residue in methanol/chloroform, and precipitating into an aqueous 5% NaHCO$_3$ solution to remove residual m-chlorobenzoic acid. Polymer 5b was readily crosslinked in solution by adding trifluoroacetic acid (TFA). For example, adding TFA to a chloroform solution of 5b produced a gelatinous, solvent-swollen mass in the previously homogeneous solution within 1–2 minutes, a qualitative indication of polymer chain cross-linking. The cross-linking presumably follows acid-catalyzed ring opening of the epoxy group to form a hydroxyl group, which then attacks an activated epoxy group on another polymer chain. Crosslinking via the epoxy group may be superior to crosslinking 4a or 4b by a process promoted by free radical initiators, because the intermediate allyl radical is relatively stable. Crosslinking may also be effected by gamma irradiation.

Polymer 4 was converted to polymer 6 by oxidation with KMnO$_4$ in the presence of NaHCO$_3$ or KHCO$_3$. Polymer 6a was soluble in an aqueous solution of Na$_2$CO$_3$ (pH>8), and was insoluble in acetone. Polymer 6b was soluble in both aqueous Na$_2$CO$_3$ and in acetone. MALDI data of 4a and 4b versus 6a and 6b showed no significant reduction in molecular weight following oxidation (i.e., the polypeptide backbone remained intact). The MALDI data also revealed repeat units still containing a C=C double bond in 6b. $^1$H NMR in perdeuteroacetone showed that residual double bonds were present in about 30% of the side chains in 6b. However, substituting potassium bicarbonate for sodium bicarbonate when oxidizing 4b resulted in full conversion of the pendent double bonds to the complete carboxylic acid derivative 6b. Even with 30–40% residual unconverted double bonds, polymers 6a and 6b were soluble in water at pH 8 or greater. However, care must be used in exposing these polymers to high pH conditions for extended periods. Attempts to remove inorganic impurities from 6a or 6b by dialysis at pH=9 for 2 days resulted in hydrolysis of the ester groups linking the side chains to the polymeric backbone. Loss of the side chains was confirmed by observation of mass loss after hydrolysis, and by $^1$H NMR of the isolated polymer, resulting in an NMR spectrum identical to that of poly(L-glutamic acid).

We have used polymer 6b as a pseudo-stationary phase in electrokinetic capillary chromatography (ECC). Preliminary experiments have shown that polymer 6b resolved several racemic mixtures when added to the mobile phase in an ECC analysis. To date, we have successfully separated racemic mixtures of the following compounds with polymer 6a: temazepam, lorazepam, oxazepam, benzoin methyl ether, binaphthol, and prednisolone. Separations were performed at voltages between 10 and 30 kV, with 0.5% to 2.5% polymer (w/v) in 100 or 200 mM Tris buffer, pH 8.

By contrast, 2.0% (w/v) poly(L-glutamic acid) (purchased from Sigma) of a similar molecular weight failed to resolve any of 62 different racemic mixtures under otherwise identical conditions. (Phosphate and borate buffer systems were also tried for the poly-glutamic acid, to no avail.) This observation led us to believe that the hydrophobic spacer between the peptide backbone and the pendent carboxylic acid group in compound 6b played an important role in the separation. The polymer's effectiveness as a pseudo-stationary phase in chiral separations appeared to be strongly related to the amount of pendent double bonds remaining after the permanganate oxidation.

For example, our preliminary ECC results indicated that when there were essentially no residual double bonds remaining in compound 6b, a high molecular weight polymer was a poor pseudo-stationary phase for resolving enantiomers. When 30–40% of the side chains contained the pendent double bond as estimated by proton NMR, the R and S enantiomers of the following compounds were readily resolved with compound 6b: oxazepam, temazepam, lorazepam, benzoin methyl ether, binaphthol, and binaphthyl phosphate. We are currently investigating whether the double bond per se is important for selectivity, or if increased hydrophobicity due to unoxidized alkenyl side chains is alone sufficient to enhance chiral selectivity, by making a pseudo-stationary phase from the product of permanganate oxidation of copolymer 1b. Quantitative oxidation of the double bonds in 1b will provide a polymer with only alkyl and carboxylated side chains.

Figure 2:
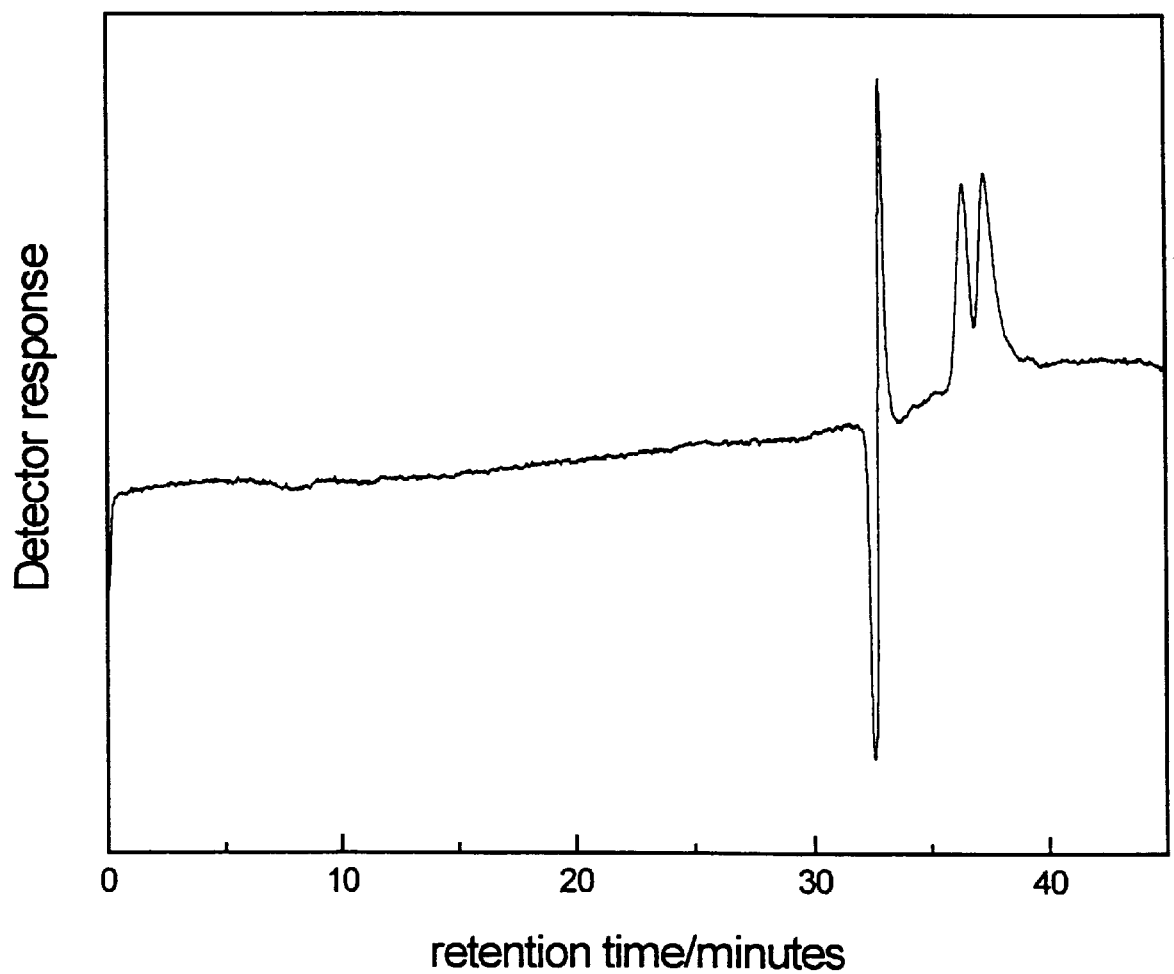
FIG. 2 illustrates a chromatogram showing a separation of racemic oxazepam using a polymer of this invention as a pseudo-stationary phase in electrokinetic capillary chromatography.

Lower molecular weight polymers (i.e., those with a d.p. less than about 50) may be more effective for ECC applications since they are more water soluble than higher molecular weight polymers. FIG. 2 shows a typical chromatogram using compound 6b (with about 40% of the side chains containing pendent double bonds) as the pseudo-stationary phase (Rs=1.0) to separate racemic oxazepam. The first peak is an artifact, the result of a refractive index change due to the methanol that was used to dissolve the samples. The next two peaks are the R and S enantiomers of oxazepam. (The elution order of the enantiomers is not currently known.)

Details of Experimental Methods

FT-IR spectra were recorded on a Perkin Elmer model 1720. The $^1$H NMR were recorded on a Bruker AC model at either 200 or 250 MHz. MALDI data were collected on a Voyager model PerSeptive Biosystems instrument. The ECC data were collected on a Beckmann PACE system. Separations were performed with uncoated fused silica capillaries (Polymicro Technologies, Phoenix, Ariz.), 50 mm i.d., 55 cm long (45.5 cm to the detector window). The ECC conditions were as follows: 200 mM TRIS, pH 8, adjusted by addition of sodium hydroxide; applied voltage 10 kV; UV detection at 254 nm. For the data shown in FIG. 2, polymer 6b was employed in the mobile phase at approximately 0.25% w/v. The THF used for the polymerization reactions was distilled from potassium metal prior to use. When ethyl acetate was used as the solvent in the NCA monomer preparation, Aldrich Sure-Seal grade was used. Other solvents or reagents were purchased from Aldrich, Inc. and used as received.

Compounds 2a and 2b, step (a) (referring to FIG. 1), were synthesized according to the method of U.S. Pat. No. 3,285,953, with the modifications noted above.

Compounds 3a and 3b, step (b), were synthesized by the method of W. Daly et al., *Tetrahedron Lett.*, vol. 29, pp. 5859 et seq. (1988), except as discussed below. Both compounds were isolated as oils. While most α-amino acid NCA derivatives show poor solubility in hexane, these NCA derivatives were quite soluble. Therefore these products were not washed with hexane. Because the NCAs were oils that could not be recrystallized, contamination of the NCA with unreacted triphosgene was avoided by using less than an equivalent of triphosgene in the reaction. Any unreacted amino acid (i.e., compound 2a or 2b) was filtered out using a celite pad and suction filtration. Despite the well-known reactivity of NCA compounds with water, the reaction mixture (using ethyl acetate as the solvent), cooled to room temperature, was washed one time with ice-cold water in a separatory funnel, and the separated organic layer was immediately dried with anhydrous MgSO$_4$. This step was preceded by an aggressive Ar or N$_2$ sparging of the reaction mixture. The purpose of these steps was to remove HCl from the NCA, as HCl will interfere with the subsequent polymerization reaction.

Compounds 4a and 4b were prepared in steps (c) and (d) as follows. Five (5.0) g (1.60×10$^{-2}$ moles) of compound 3b were dissolved in 20 mL of dry THF. If a copolymer was desired (e.g., 1b) the appropriate quantity of NCA was co-dissolved with compound 3b. An appropriate amount of n-butyl amine initiator was added, the quantity depending upon the molar mass range desired for the polymer. For example, for a polymer with a degree of polymerization (d.p.) approaching 50, the monomer:initiator molar ratio was 50. Polymers with higher d.p.'s were made by adding 0.1 mL of triethylamine to the reaction. (The [monomer]:[initiator] ratio did not predict d.p. in this case.) After stirring 5 days at room temperature under a calcium chloride-filled drying tube, the reaction mixture was concentrated to about ⅓ of its original volume, and the polymer was precipitated into methanol. The sticky solid was vacuum dried at room temperature. Typical isolated yields were 75–85%. Using THF to polymerize compound 4a resulted in a very gelatinous mixture, one that was sufficiently viscous to prevent a magnetic stirrer from moving. Therefore, the polymerization of 4a was instead conducted in chlorobenzene, which prevented gelation. FT-IR data of films cast on a NaCl plate showed amide I and II bands in positions consistent with an α-helix.

The same procedure was used to prepare compounds 5a and 5b in step (e). Two (2.0) g (7.5×10$^{-3}$ mole) of compound 4b (or 4a) were dissolved in 60 mL of CHCl$_3$. A large molar excess of m-chloroperoxybenzoic acid (MCPBA), 2.0 g (0.012 mole), was added and the reaction was refluxed for about 3 hours. The cooled reaction mixture was washed with saturated sodium bicarbonate solution and water in turn to remove m-chlorobenzoic acid. The chloroform layer was dried over anhydrous magnesium sulfate, evaporated to a small volume, and co-dissolved by addition of a few mL of methanol. This solution was poured into 100 mL of aqueous 5% sodium bicarbonate to precipitate the polymer. The isolated yield was 75%. The $^1$H NMR indicated complete reaction of the carbon-carbon double bonds, with signals indicating a terminal epoxy group: 2.45 ppm (t); 2.70 ppm (t); 2.90 ppm (m). A solution of this polymer about 10% w/v or greater in chloroform formed a stiff, non-flowing "gel" when mixed with a few drops of trifluoroacetic acid. Polymers 5a and 5b will be useful as crosslinkers, and in forming crosslinked gels.

Production of polymers 6a and 6b, step (f), was the same for the two polymers except that THF was not used in the synthesis of 6a. Two (2.0) g (7.5×10$^{-3}$ mole) of compound 4b were dissolved in 50 mL of THF. After the polymer had dissolved, 50 mL of acetone were added. Two (2.0) g of sodium bicarbonate were added to the stirred solution, followed by 1.3 g of potassium permanganate. The reaction turned brown within minutes as manganese (IV) oxide formed. The suspension was stirred 10–12 hours. The suspension was then poured into 50 mL of water containing 2.0 g sodium carbonate. Then 2.0 g sodium bisulfite were added to reduce any remaining permanganate. Two-three small scoops of celite were added, and the suspension was suction-filtered. The yellow filtrate was concentrated to remove organic solvents. Concentrated sulfuric acid was slowly added to the remaining aqueous solution until an acidic pH was reached, causing precipitation of compound 6b. The precipitate was isolated by centrifugation at 5000–7000 rpm for 15 minutes. The pellets were washed with water in the centrifuge tubes several times, and the solid was again recovered by centrifugation. The wet pellets were dissolved in acetone, and the solution was gravity-filtered to remove small quantities of insoluble material. Compound 6b was isolated by evaporation of the acetone. Isolated yield was about 50–60%. The FT-IR and $^1$H NMR were consistent with the formation of carboxylic acid groups. About 30–40% of the side chains still contained double bonds (as estimated by $^1$H NMR). If desired, these double bonds may be oxidized to near completion by increasing the quantity of permanganate, or by changing the base from sodium bicarbonate to potassium bicarbonate.

The length of the side chains may be important in determining selectivity. The difference in selectivity between the novel compounds and poly-glutamic acid shows that the hydrophobic groups are important to selectivity, so it stands to reason that the length of these hydrophobic groups also plays a role.

As desired, the distribution of C=C double bonds and carboxyl groups in polymer 6b may be random (as when the stoichiometry or reaction time with permanganate does not allow complete oxidation), regularly spaced, or the distribution may be that of a block copolymer (as when oligomers are synthesized separately, and then linked to one another).

Chiral polymers in accordance with the present invention may be used in liquid chromatography, for example as part of the mobile phase in a reversed-phase system employing a C-18 column. Especially in chromatographic systems, chiral polymers in accordance with the present invention may be used on a preparative scale to purify large quantities of racemic mixtures.

Chiral polymers in accordance with the present invention could be used in otherwise-conventional liquid-liquid extraction systems, in which the polymer is soluble only in one of the liquid phases. For example, polymer 6b could be used in an aqueous phase extraction of a chiral compound that is soluble in an organic phase such as chloroform.

Chiral polymers in accordance with the present invention could also be used in a selective extraction medium or liquid membrane transport system, in which one enantiomer is preferentially transported across a membrane. For example, a membrane system could be constructed from a three-phase system comprising an aqueous phase containing the chiral polymer and two organic phases, in which each of the three phases is immiscible in the other two, and in which the aqueous phase is intermediate in density between the two organic phases. The aqueous phase with the chiral polymer acts as a transport membrane between the two organic phases. A racemic mixture dissolved in one of the organic phases could be resolved by selective transport through the aqueous membrane into the other organic phase.

Chiral polymers in accordance with the present invention could also be used in an enhanced ultrafiltration method. In this technique, the polymer is added to an aqueous phase containing a racemic mixture. The aqueous mixture is then passed through an ultrafiltration membrane whose pore size is small enough to prevent the polymers from passing through. The enantiomer with the higher affinity for the polymer is enriched in the retainant, and the solution passing through the filter is enriched in the other enantiomer.

In chromatographic applications, chiral polymers in accordance with the present invention may be present in the mobile phase, or they could instead be incorporated into chiral stationary phases such as gels, wall coatings, and packed columns and capillaries through means known in the art. For example, a gas chromatography capillary column may be packed with silica particles that have been coated with the chiral polymer. Another possibility is the combination of a chiral mobile phase incorporating the chiral polymer in accordance with the present invention, with a different chiral stationary phase. This combination can result in separation efficiencies that are greater than the sum of the parts.

Where a particular set of conditions results in the separation of two enantiomers, then the same or similar conditions should, in general, also successfully separate homologues of those enantiomers, as well as other enantiomers with similar structures.

Unless specified otherwise, the backbone of the polymer recited in each of the claims may comprise L-amino acid residues, or D-amino acid residues; but a given polymer backbone should not contain equivalent amounts of both L-amino acid residues and D-amino acid residues.

The complete disclosures of all references cited in this specification are hereby incorporated by reference. In the event of an otherwise irreconcilable conflict, however, the present specification shall control.

We claim:

1. A compound comprising a polymer or a salt of a polymer, wherein said polymer has repeating units of the formula

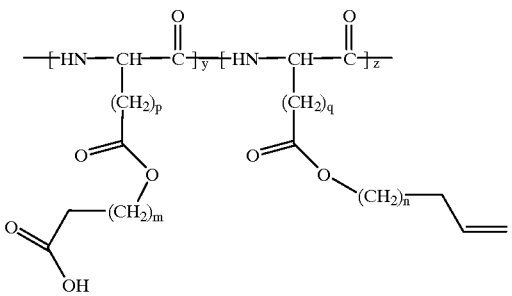

wherein y is between 0.3 and 1.0; wherein z is between 0.0 and 0.7; wherein the sum of y and z is 1.0; wherein the monomer subunits designated with the subscripts y and z in the formula above are randomly or regularly distributed with respect to one another, or are distributed to form a block copolymer; wherein m is an integer between 0 and 19; wherein m is the same in all cases, or m differs between different monomer subunits of said polymer; wherein n is an integer between 0 and 19; wherein n is the same in all cases, or n differs between different monomer subunits of said polymer; wherein p is 1 or 2; wherein p may be the same in all cases, or p may differ between different monomer subunits of said polymer; wherein q is 1 or 2; and wherein q may be the same in all cases, or q may differ between different monomer subunits of said polymer.

2. A compound as recited in claim 1, wherein y is between 0.5 and 0.7; and wherein z is between 0.3 and 0.5.

3. A compound as recited in claim 1, wherein m is an integer between 2 and 7, and wherein n is an integer between 2 and 7.

4. A compound as recited in claim 1, wherein the monomer subunits designated with the subscripts y and z in the formula are randomly or regularly distributed with respect to one another, but do not form a block copolymer.

5. A compound as recited in claim 1; wherein y is between 0.5 and 0.7; wherein z is between 0.3 and 0.5; wherein m is an integer between 2 and 7; wherein n is an integer between 2 and 7; and wherein the monomer subunits designated with the subscripts y and z in the formula are randomly or regularly distributed with respect to one another, but do not form a block copolymer.

6. A compound as recited in claim 1, wherein y is between 0.9 and 1.0; wherein z is between 0.0 and 0.1; wherein m is 0; and wherein n is 0.

7. The product of fully or partly condensing a compound as recited in claim 1 with at least one chiral amino acid.

8. A compound comprising a polymer or a salt of a polymer, wherein said polymer has repeating units of the formula

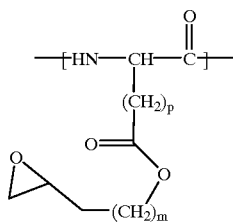

wherein m is an integer between 0 and 19; wherein m is the same in all cases, or m differs between different monomer subunits of said polymer; wherein p is 1 or 2; and wherein p may be the same in all cases, or p may differ between different monomer subunits of said polymer.

* * * * *